Figure 1:
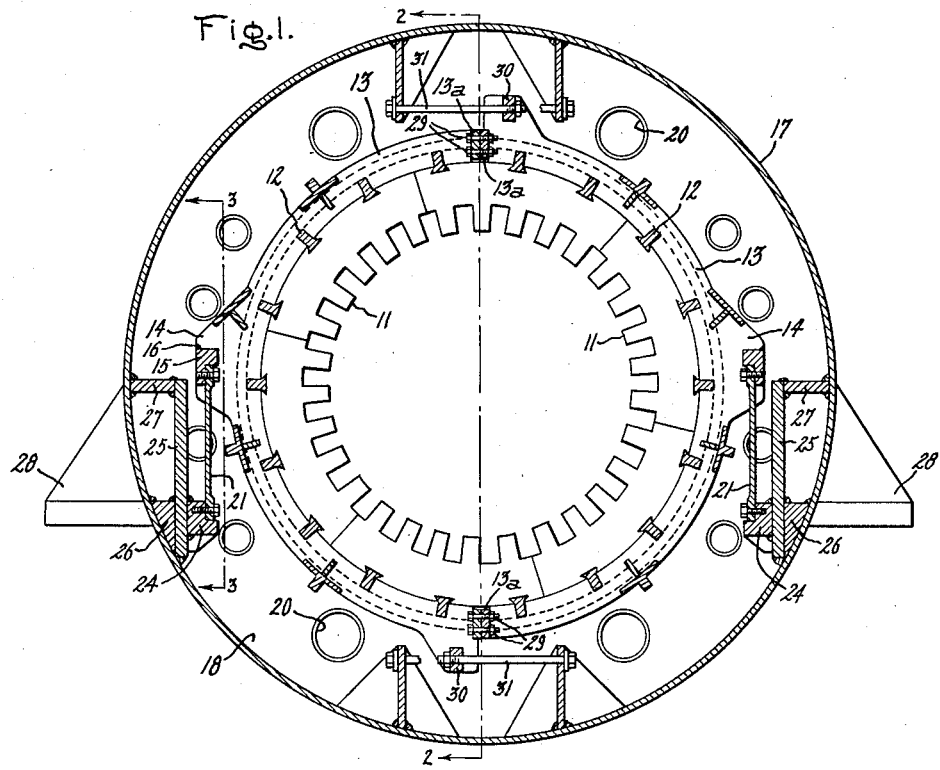

May 22, 1951 H. D. TAYLOR 2,554,226
DYNAMOELECTRIC MACHINE CORE MOUNTING
Filed Dec. 30, 1949 2 Sheets-Sheet 1

Inventor:
Hamilton D. Taylor,
by Ernest C. Britton
His Attorney.

May 22, 1951          H. D. TAYLOR          2,554,226
DYNAMOELECTRIC MACHINE CORE MOUNTING
Filed Dec. 30, 1949          2 Sheets-Sheet 2
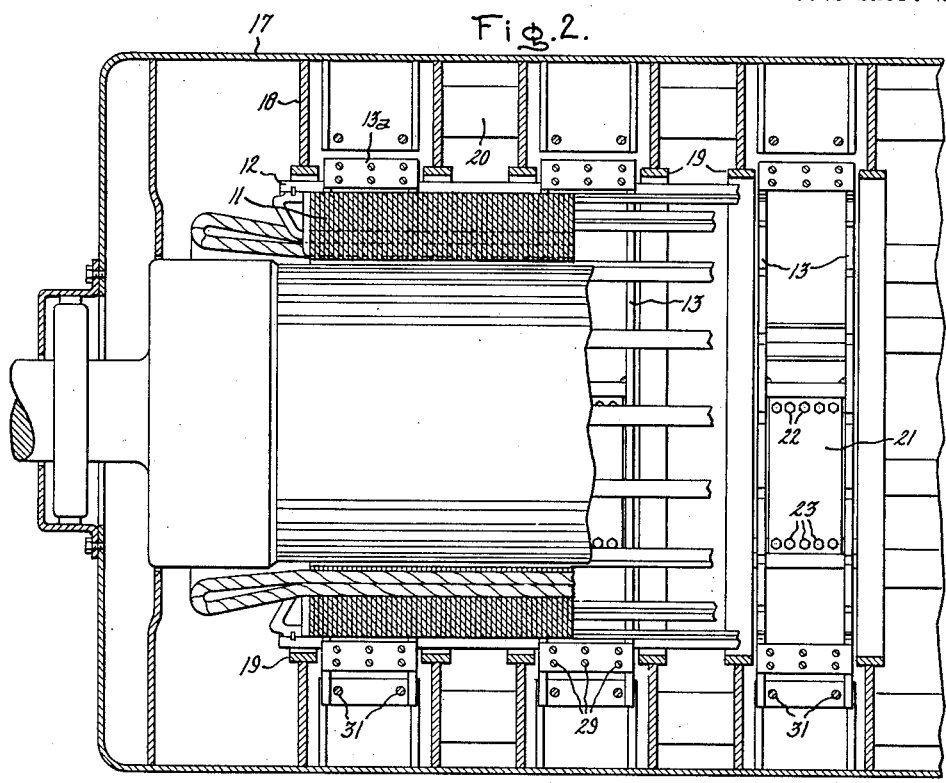
Inventor:
Hamilton D. Taylor,
by Ernest C. Britton
His Attorney.

Patented May 22, 1951

2,554,226

UNITED STATES PATENT OFFICE 2,554,226

DYNAMOELECTRIC MACHINE CORE MOUNTING

Hamilton D. Taylor, Niskayuna, N. Y., assignor to General Electric Company, a corporation of New York Application December 30, 1949, Serial No. 135,920

5 Claims. (Cl. 171—252)

My invention relates to improvements in dynamoelectric machines and has particular significance in connection with stator core mounting arrangements for turbine generators such as those provided with a two-pole rotating field member.

Troubles have long been encountered in the construction of dynamoelectric machines (such as turbine generators) characterized by a revolving field of constant intensity causing mechanical vibration in the stationary member accompanied by annoying noises and resultant vibration of many associated items even including (in some cases) exciter brush arm brackets, delicate relay parts and the structure of the enclosing building. Many large machines are designed for 3600 R. P. M. operation so that the rotor is a two-pole field member and its rotation brings about a distortion of the stator into an elliptical shape. The distortion revolves in synchronism with the rotor and it is well known to those skilled in the art that points on the stator core vibrate at a frequency double that of rotation in not only a radial direction but a tangential direction as well.

Heretofore, it has been known to attempt to isolate the vibration by mounting the stator on vertically extending spring feet which are flexible radially of the core member, for example as disclosed and claimed in U. S. Patent 2,217,788 issued October 15, 1940, on an application filed by Winchester G. Blake and assigned to the assignee of the present invention. Such prior art constructions have been satisfactory in many applications but in some instances, especially in the case of larger machines, such spring feet do not satisfactorily prevent the transmission of vibrating components which may be regarded as tangential with respect to the core, because the feet are not attached at points of zero or nearly zero tangential motion.

It is an object of the present invention to provide simple means for overcoming the above-mentioned difficulties.

It is a further object of the present invention to provide an improved core mounting arrangement for a large dynamoelectric machine.

A still further object of the present invention is to provide a turbine generator stationary core supporting assembly comprising an outer frame and an inner frame, with the inner frame comprising rings arranged to vibrate as a single unit with the core and having projections therefrom which partake of the motion thereof without affecting such vibration and on which there are points of zero tangential movement at which spring feet are attached for mounting said inner frame through said feet on said outer frame.

Figure 3:
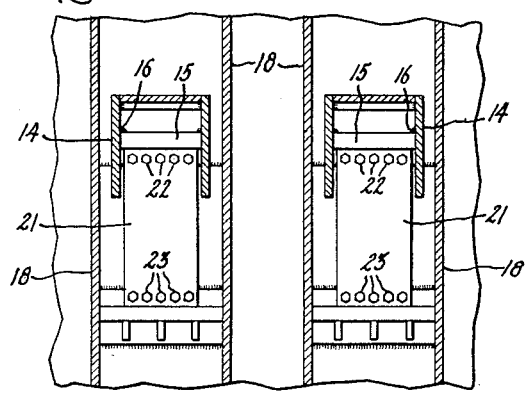

Further objects and advantages will become apparent and my invention will be better understood from consideration of the following description taken in connection with the accompanying drawing in which Fig. 1 is an end view of a dynamoelectric machine embodying my improved stationary member supporting arrangement; Fig. 2 is a partial sectional view taken along line 2—2 of Fig. 1; Fig. 3 is a partial sectional view taken along 3—3 of Fig. 1; Fig. 4 is a graph indicating the relation of tangential displacement of points on the inner and outer surfaces of a thick steel ring which may be considered as the equivalent of the assembly of the inner frame and the stator core of Fig. 1; and Fig. 5 represents a graphical plot of theoretical and observed tangential deflections at various points across the core 11, its rings 13 and the stub projections 21, with tangential deflection plotted as a fraction of radial deflection against distance along the radius.

In Figs. 1–3, I have shown my invention in connection with a dynamoelectric machine stationary member comprising a laminated magnetic core comprising arcuate sectors of punching stacks 11 each supported by a plurality of circumferentially spaced key bars 12 each held in a plurality of annular supporting and stiffening rings 13 arranged in longitudinally spaced relation. Each of these rings have side projections 14 provided in order to reach points of zero tangential motion, as hereinafter more fully explained. Between alternate adjacent projections 14 of rings 13 (see Fig. 3) relatively short longitudinally extending bars or plates 15 are provided as by being secured by welds 16 to the inner faces of the projections.

The outer frame of the machine comprises an outer wrapper plate 17 and a plurality of longitudinally spaced annular rings 18 which may be interleaved with the rings 13 (as shown) in order that the inner diameter of the outer frame may be less than the outer diameter of the inner frame. Such interleaving becomes of importance when it is considered that a certain outer diameter of inner frame is desirable in order to provide sufficient rigidity thereof while a smaller inner diameter of outer frame may be found desirable to obtain the optimum natural frequency of outer frame for best isolation performance. This natural frequency of outer frame may be found enhanced without further decrease of outer frame inner diameter by providing heavy flange rings 19 (see Fig. 2) around the inner bore of the outer frame rings or section plates 18. If desired conventional ducts 20 may be provided to establish ventilating medium communication between spaces defined by the plates 18.

Inner frame and outer frame are tied together by a plurality of vertical spring plates 21 each attached to the inner frame by a plurality of bolts 22 securing it to the respective cross bar 15 and secured to the outer frame by a plurality of bolts 23 threadedly engaging cross pieces 24 which may be welded to the adjacent faces of the outer frame rings 18, and also welded to a supporting assembly having structural members 25—27 adjacent outer supporting feet 28.

In order that the inner frame rings and the stator core will vibrate substantially the same as an integral unit, it is advantageous to have the rings pressed tightly against the core and accordingly I provide the rings 13 in 180° halves as shown, with the halves provided with axially extending flange portions of plates 13a adapted to be bolted together by bolts 29.

While it is intended that the flexible spring feet 21 (Fig. 1) shall support the weight of the inner frame, core and coils, it is desirable to anchor this frame against transverse displacements and so I have shown the top and bottom of the inner frame rings 13 secured at axially extending flange portions 30 (at approximately the same radius as bars 15) to transverse rods 31 rigidly held in place by the outer frame assembly.

One difficulty in constructions of this sort is that the elliptical distortions caused by rotation of the two-pole field as hereinabove explained causes not only radial movement of any point on the stator core but tangential movement as well. The radial movements can be readily absorbed by the spring feet 21 and the transverse bars 31 (and thereby not transmitted to the outer frame) but tangential movements cannot be so absorbed. However, in Fig. 4, I have shown tangential displacement plotted against ring thickness ratio for a solid steel cylindrical ring. For the purpose of determining the optimum point of attachment for the spring feet 21 joining inner and outer frames, the core and inner frame comprising the stator laminations 11, key bars 12 and inner rings 13 (of Figs. 1–3) may be treated as a single fixed cylinder or ring with a tangential displacement at any point on the inner edge thereof represented by the curve 31 of Fig. 4 and the tangential movement of any point on the outer edge thereof represented by curve 32 of Fig. 4. In Fig. 4 relative tangential displacement based on outside radial displacement is plotted against thickness ratio of outside diameter to inside diameter varying from an absolute minimum of one (i. e., zero thickness) to a maximum plotted value of two. It will be observed from Fig. 4 that the curve 32 is asymptotic to the zero axis, or, in other words, so long as any point to be considered is on the inner frame itself, it cannot have zero tangential motion. Even though tangential displacement amplitude varies with ring depth and is materially less at the outer diameter than at inner diameter, a place of zero tangential motion can be found only at some position outside of the outer diameter of the inner frame which includes the rings thereof. Such a point can be reached only by adding structure (outside the core and its rings) which will partake of the motion of this inner frame without affecting that motion. From both calculated and test values, I have found that with an attachment at some point substantially outside of the outer diameter of the arcuate part of the inner frame, zero tangential motion can be achieved while at the same time the spring feet will take up any radial motion due to double frequency vibration caused by a rotating two-pole field.

In Fig. 5 calculated (i. e. theoretical) tangential deflection for points across the core 11 and one of its rings 13 is plotted against distance (along the radius in inches) as indicated by curve 33, the tangential deflection for any point being expressed as a decimal fraction of the radial deflection for the same point. It is exceedingly difficult if not practically impossible to calculate values to carry this theoretical curve 33 on across a stub projection (such as 14) since calculations can readily be made only for an added ring which would change the tangential motion for all of the points. However, actual test results were obtained and checked with a light beam displacement indicator and from these results the curve 34 (for points across ring and stub projection) was derived to indicate tangential deflection not only across the ring but outside of it. It is apparent from Fig. 5 that the point of zero measured tangential deflection (i. e., at the bottom dip of curve 34) is substantially the same as the zero point which would be derived by extending the theoretical curve 33.

It is apparent that the stationary frame of the machine described and illustrated is a duplex structure in which there is an outer frame and an inner frame the latter comprising inner rings 13, while at the same time outwardly extending projections on the inner rings provide points of attachment (for spring feet 21 or restraining bars 31) at optimum points of zero (or practically zero) tangential motion so that the entire structure may be of relatively light weight and yet will not transmit vibrations to the supporting foundation.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a rotatable member and a stationary member, said stationary member comprising an outer assembly, inner rings and a magnetic core portion clamped within said inner rings, projections on each of said inner rings extending radially outward therefrom to reach points of zero tangential motion, vertically extending spring feet flexible substantially radially of said core and connected at said points of zero tangential motion to said projections extending radially from said inner rings and connected to said outer assembly for supporting said inner rings therefrom.

2. A dynamoelectric machine of the turbine generator type having an outer frame, and an inner stator core and frame assembly with the inner frame supporting the core and comprising arcuately subdivided ring portions clamped on said core, each of said subdivided ring portions having stub projections extending radially outward therefrom to reach points of zero tangential motion, and a plurality of flat supporting plates arranged as spring feet each secured at one vertical end thereof to at least one of said stub projections at said point of zero tangential motion and at the opposite vertical end thereof to said outer frame.

3. A dynamoelectric machine having a rotatable member and a stationary member, said stationary member being provided with a laminated core arranged to cooperate electrodynamically with said rotatable member, a plurality of key bars for securing and retaining said laminated core in assembled relation, a plurality of annular rings surrounding said core and secured to said key bars for supporting said core, an outer frame comprising an outer wrapper plate and a plurality of annular rings extending inwardly from said wrapper plate, circumferentially spaced projections formed integral with said first mentioned annular rings and extending outwardly beyond the outer diameters of said first-mentioned annular rings, and means including a plurality of vertically extending transversely flexible spring feet secured adjacent one end thereof to said projections at points of zero tangential motion and secured adjacent the opposite ends thereof to said second-mentioned annular rings for supporting said core and first-mentioned rings on said outer frame.

4. A dynamoelectric machine stationary member comprising a magnetic core section, a plurality of circumferentially spaced key bars arranged to support said magnetic core section, a plurality of annular supporting rings arranged in longitudinal spaced relation and arranged to support said key bars, each of said rings being provided with a plurality of stub projections extending radially outward therefrom to reach points of minimum tangential motion, vertically extending plates connected at one end thereof to said stub projections at said points of minimum tangential motion to act as spring feet which are flexible radially of said core and substantially rigid axially and tangentially thereof, an outer frame arranged to support the opposite ends of said spring feet and including a plurality of annular plates interposed between said key bar supporting rings; said outer frame including an outer wrapper plate arranged around said annular plates, additional stub projections on said key bar supporting rings, and means for securing said additional stub projections to said outer frame, said last means including transversely extending members secured to said additional stub projections at substantially the same radius as said first projections are secured to said spring feet, for minimum transmission of tangential vibration from inner core and ring assembly to outer frame.

5. A dynamoelectric machine stationary member comprising a magnetic core section, a plurality of circumferentially spaced key bars arranged to support said magnetic core section, a plurality of annular supporting rings arranged in longitudinal spaced relation to support said key bars, each of said rings being provided with a plurality of stub projections extending radially outward therefrom to reach points of zero tangential motion, vertically extending plates operatively associated at one end thereof with said stub projections at the respective points of zero tangential motion to act as spring feet which are flexible radially of said core and substantially rigid axially and tangentially thereof, an outer frame arranged to support the opposite ends of said spring feet and comprising a plurality of annular plates having a smaller inner diameter than the outer diameter of said key bar supporting rings and interposed between said key bar supporting rings, said outer frame also comprising an outer wrapper plate arranged around said annular plates, additional stub projections on said key bar supporting rings, and means for securing said additional stub projections to said outer frame, said last means including transversely extending bar members secured to said additional stub projections at substantially the same radius as said first projections are secured to said spring feet for minimum transmission of tangential vibration from inner core and ring assembly to outer frame.

HAMILTON D. TAYLOR.

REFERENCES CITED

The following references are of record in the file of this patent:

UNITED STATES PATENTS

| Number | Name | Date |
| --- | --- | --- |
| 2,199,141 | Rice | Apr. 30, 1940 |
| 2,320,843 | Baudry | June 1, 1943 |
| 2,424,299 | Baudry et al. | July 22, 1947 |